Figure 3:
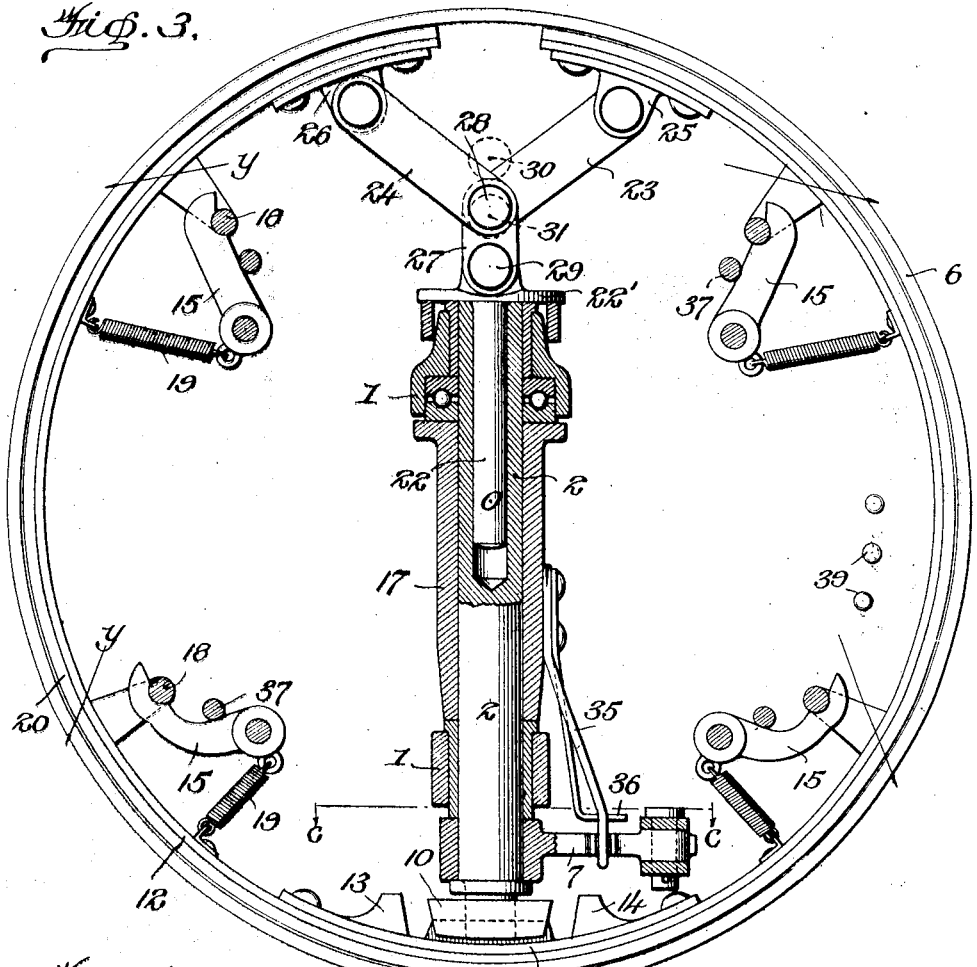

April 15, 1924.
G. L. SMITH
FRICTION BRAKE
Filed Aug. 30, 1923
1,490,642
3 Sheets-Sheet 1
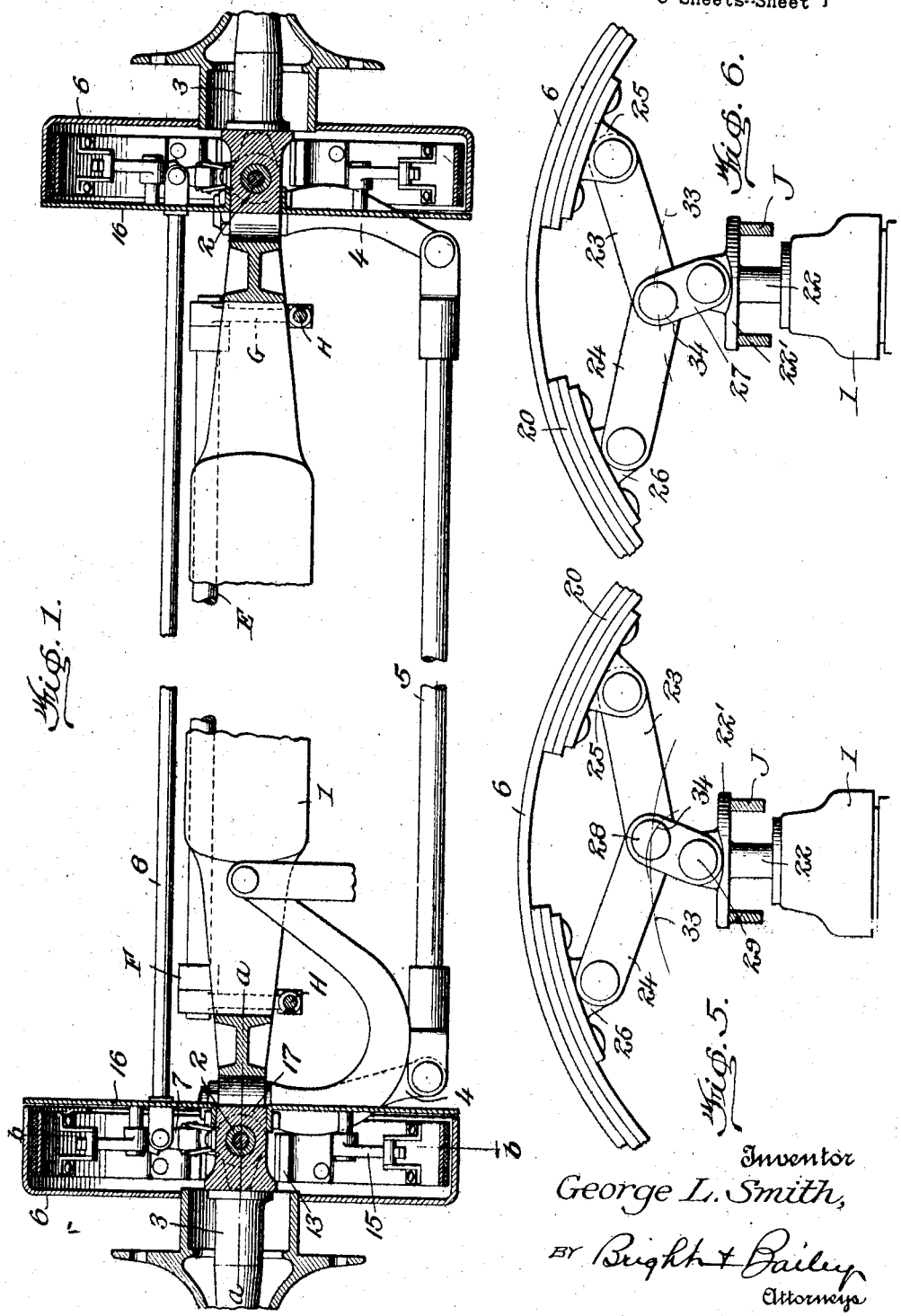
Inventor
George L. Smith,
By Bright & Bailey
Attorneys April 15, 1924.
G. L. SMITH
FRICTION BRAKE
Filed Aug. 30, 1923
1,490,642
3 Sheets-Sheet 2
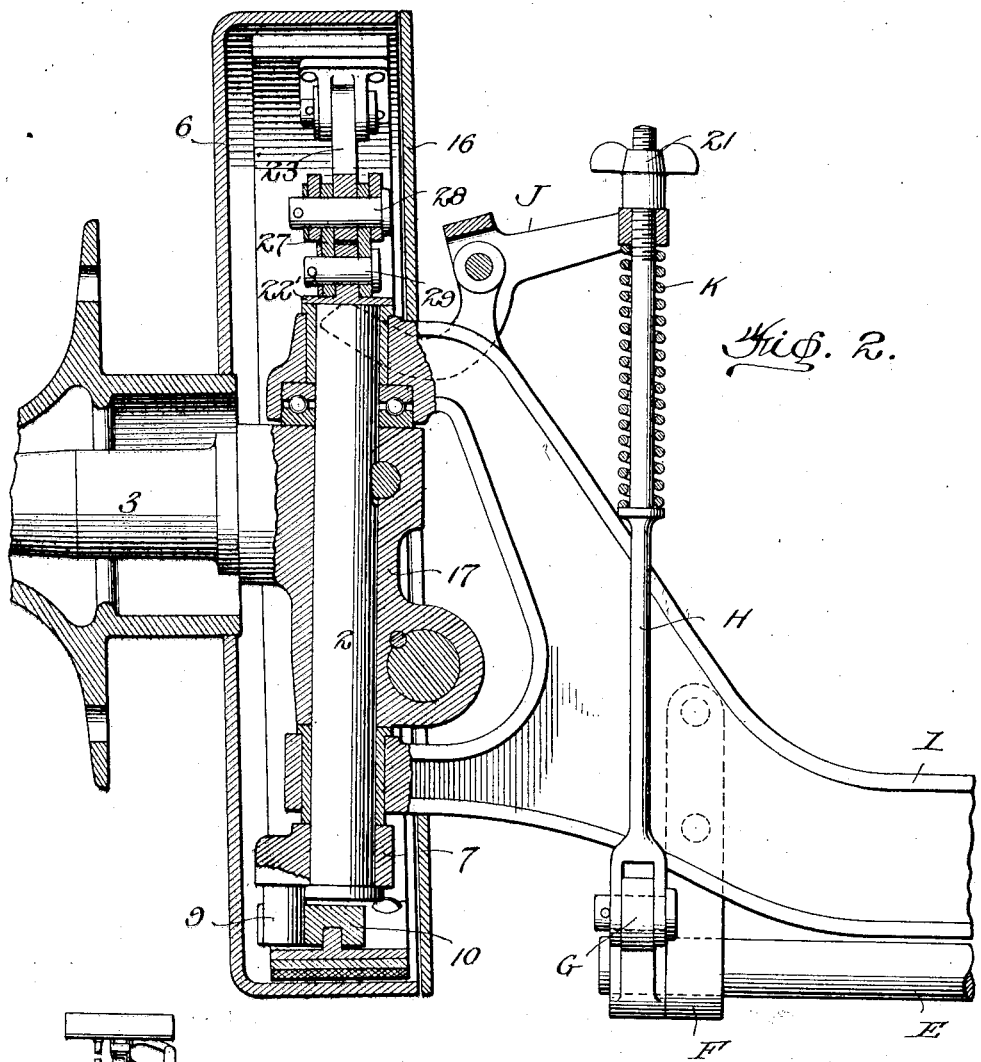
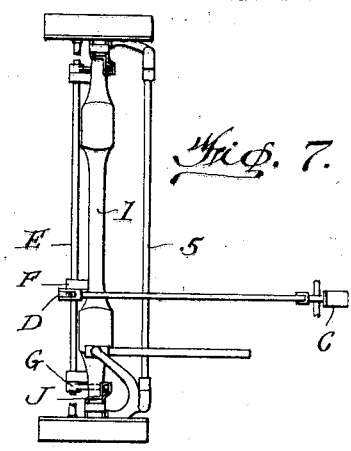
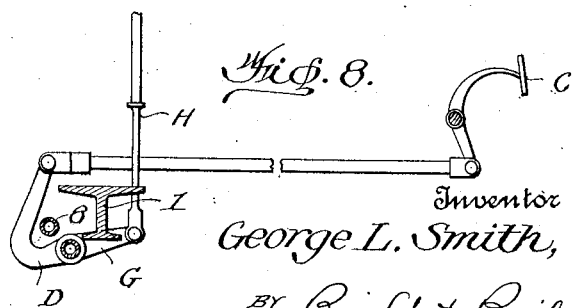
Inventor
George L. Smith,
BY Bright & Bailey
Attorneys April 15, 1924.

G. L. SMITH 1,490,642

FRICTION BRAKE

Filed Aug. 30, 1923   3 Sheets-Sheet 3

Inventor
George L. Smith,
BY Bright & Baley
Attorneys

Patented Apr. 15, 1924.

1,490,642

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

FRICTION BRAKE.

Application filed August 30, 1923. Serial No. 660,190.

*To all whom it may concern:*

Be it known that I, GEORGE L. SMITH, a citizen of the United States, and resident of Washington, in the District of Columbia, have invented certain new and useful Improvements in Friction Brakes, of which the following is a specification.

The object of my invention is to apply the principles of brake equalization outlined in my Patent No. 1,440,842 to the front or steering wheels of a vehicle and to accomplish not only the desirable results obtained from such equalization, but also to secure the brakes against rotation in such a manner that their application will have no effect whatever on the steering of the vehicle, and to so apply the equalizing principle outlined in the above mentioned Letters Patent that equalization is effected when the brakes are applied either in going ahead or backing the vehicle.

Figure 4:
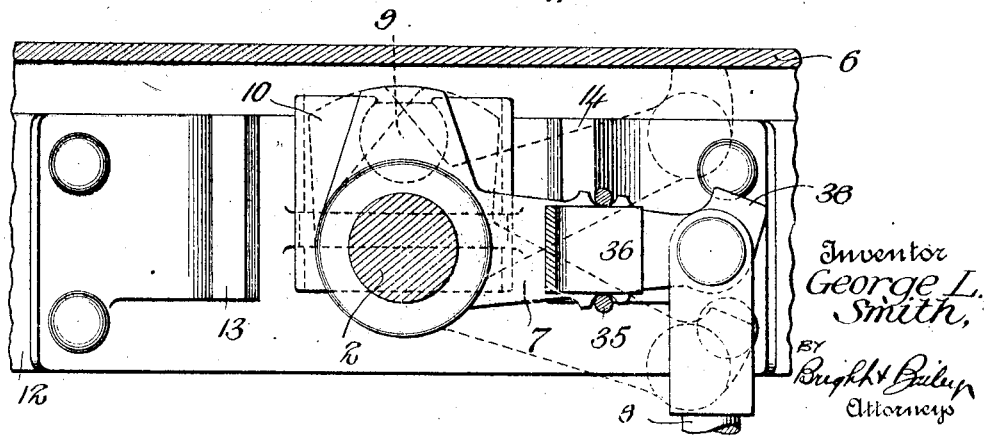

In the drawings chosen to illustrate my invention, the scope whereof is set forth in the appended claims Figure 1 is a plan view of the front axle of an automobile showing my invention applied, certain parts being in section;

Figure 2, an enlarged section on the line *a*—*a* of Figure 1;

Figure 3, an enlarged section on the line *b*—*b* of Figure 1;

Figure 4, an enlarged section on the line *c*—*c* of Figure 3;

Figure 5, a detail view showing a position assumed by the toggle connection of the left hand brake in Figure 1 when the brake is applied during forward movement of an automobile;

Figure 6, a view similar to Figure 5 showing a position assumed by the toggle connection when the brake is applied during rearward movement of an automobile;

Figure 7, a plan view of a conventional brake applying mechanism of an automobile with my invention operatively included; and Figure 8, a detail sectional view showing the connection between my equalizing mechanism and a conventional brake applying mechanism.

Referring to the drawings the numeral 1 indicates the front axle, 2, 2 the king pins perpendicular thereto, 3, 3 the axles upon which the front wheels (not shown) are mounted, 4, 4 the steering knuckle arms, and 5 the tie rod connecting these arms. As the parts of my inventive construction as applied to the left wheel (not shown) in Figure 1 are indentical with those applied to the right wheel (not shown), I will only describe same with reference to the left wheel and apply the reference characters employed to corresponding parts utilized in connection with the right wheel. Referring to the parts applied to the left wheel, 6 represents the brake drum carried by the wheel, 7 the left bell-crank pivoted on the king pin 2, and 8 the equalizer rod connecting the long arms of the right and left bell-cranks. 9 represents the pivot at the end of the short arm of the bell-crank which engages in a block 10, 11 represents the anchor block secured to the brake band 12 and carries a guide operating in a slot in the block 10. Abutments 13 and 14 spaced at a distance a little greater than the length of the block 10 permit the band 12 to rotate freely until they engage either end of the block 10 after which any further rotation is resisted by the block 10 which cannot move without rotating its bell crank.

A plate 16 encloses the brake and is secured by suitable bolts to the steering knuckle 17. This plate is cut away to show the interior mechanism. Levers 15 are pivoted on the plate 16 and are held by means of springs 19 in engagement with clips 18 riveted to the brake band 12. The arrows marked Y indicate the direction of motion of various points on the brake band when it is expanded to take up for wearing down of the brake lining 20 and the levers 15 are so pivoted as to constrain the clips 18 to move in their proper directions to provide for such expansion of the band. That is, the line between pivot and clip 18 for each lever is perpendicular to the corresponding arrow Y. This method of holding the band in conjunction with other structure to be hereinafter referred to affords means for obtaining proper adjustment of the band.

Expansion and contraction of the band in normal application and release of the brakes is effected by a bolt 22 slidable axially in the pin 2 and connected to the band 12 by toggle links 23 and 24. I effect movement of the bolt 22 to apply the brakes by operation of the usual foot pedal C, which is connected to an arm D fixed on a brake shaft E rotatably mounted in brackets F carried on the axle 1. This shaft also has an arm G fixed to each end thereof and the free end of each of these arms is connected by a link H to one end of a related lever J, which latter is pivotally mounted on the axle and has the end thereof remote from the link H bifurcated to embrace the upper end of the knuckle 17 and engage under a flange 22' on the upper end of the related bolt 22. The lever J has sliding connection with the link H and is operated against on its lower side by a spring K carried by the link and on its upper side is engaged by a thumb nut 21 threaded on the link. By the method of holding the band as heretofore described proper adjustment can be obtained by means of the thumb nut 21 which regulates the initial position of the bolt 22 and controls the movement of the toggle mechanism, which latter I will describe with greater particularity.

The toggle links 23 and 24 are pivoted to the two free ends of the band by the pads 25 and 26 and are pivoted together and to the compensating link 27 by the pin 28. The lower end of this link 27 is pivoted to the bolt 22 by the pin 29. Upward movement of the bolt 22 under the influence of the lever J will force the pin 28 upward and operate the toggle links 23 and 24 to expand the band. When the brake band engages the drum 6 it will rotate freely with the drum until stopped by the abutment 13 for rotation in a counter-clockwise direction and by the abutment 14 for rotation in a clockwise direction. This free rotation of the band will swing the compensating link 27 so that it will point either to the right or left of the center of rotation O as shown in Figures 5 and 6. Since the pivot 29 is well above this center of rotation O the swinging of the pivot 28 about the pivot 29 from its initial position in either direction will decrease the distance between the center O and the pivot 28 and result in a slackening of the brake pressure. If the bolt 22 is forced upward until the pin 28 is at 30 and the pin 29 at 31 and the band has rotated clockwise until the abutment 14 has engaged the block 10, then the pin 28 will be swung to the right as shown in Figure 5. From this position any further rotation of the band will be controlled by the equalizer mechanism, the brake on the side pulling the hardest will rotate with the drum and the one of the opposite side in the opposite direction. For this further rotary movement it would be necessary for the pin 28 to travel on the arc 33 to maintain the brake pressure constant, but since it must travel on the arc 34 about the center of the pin 29 the desired variation in brake pressure to produce equal braking effect of the two brakes will be obtained in the same manner as described in my Letters Patent 1,440,842. It will also be seen that a similar action will take place when the direction of rotation of the drums is reversed as shown in Figure 6, so that an equalization of brake effect will be attained regardless of the direction of rotation of the brake drums.

In turning the wheels for purposes of steering it is necessary that the short arms of the bell-cranks remain perpendicular to the plane of the brakes or nearly so, and to force the bell-cranks to follow the movement of the wheels, a double spring 35 and a finger 36 are secured to the steering knuckle 17 on each side, one half of each spring bearing on one side of the bell crank lever and the other half on the other side. It is also necessary to rotate the bands to neutral position when brakes are released and this is done through the action of the levers 15 and springs 19. The levers are limited in movement by stops 37, so that those on each side act to rotate the band up to but not beyond the neutral position.

When brakes are applied the pull of the bands is taken up by the bell-cranks and equalizer rod, and since the bell-cranks are pivoted on the king pins, they can exert no turning effect on them nor on the steering knuckles, so that no strain is placed on the tie rod 5 or any other part of the steering mechanism, unless the swing of the bell-cranks in effecting equalization is so great that the toe 38 on the end of bell-cranks hits against the brake drum. But in this case a distinctive chafing noise will be made by such contact, thus warning the driver that brakes need adjusting. In carrying out this feature of my invention I provide projections 39 on the brake drums for engagement by the toe 38, such projections on one drum being different in number from those on the other drum, so that one toe engaging its related set of projections will produce a sound distinctively different from that produced by the engagement of the other toe with its related set of projections. In this manner the driver is signalled as to which brake needs adjusting.

While I have shown my equalizing parallelogram as being a true rectangle, it is evident that I can make my equalizer rod slightly longer or shorter than the distance between king pins, changing the bell-crank angles accordingly, and thus throw the parallelogram out of true for the purpose of varying the equalization slightly in turning a corner while still maintaining perfect equalization when driving straight ahead. This action might be found desirable to produce a slight righting action of the steering wheels, or to neutralize the effect of friction on the various moving parts, or to produce smoother action of the front brakes in retarding the car which at the time is traversing a curved path.

I claim:—

1. In a brake system, the combination with duplicate internal expanding brakes, of means connecting the two brakes to equalize the braking effect of said brakes.

2. In a brake system, the combination with duplicate brakes angularly movable on spaced axes, of means connecting the brakes to equalize the braking effect of said brakes.

3. In a brake system, the combination with duplicate brakes angularly movable on spaced axes respectively, of mechanism to equalize the braking effect of said brakes when the latter are applied and including connections between the brakes, and means operable independently of said connections to apply the brakes.

4. In a brake system, the combination with duplicate brakes angularly movable about spaced axes respectively, of means operable by the braking forces of said brakes to equalize said forces.

5. In a brake system, the combination with duplicate brakes, each having rotary movement on one axis and bodily angular movement on another axis, of means operated by rotary movements of the brakes to equalize their braking effect.

6. In a brake system, the combination with duplicate brakes, each having rotary movement on one axis and bodily angular movement on another axis, of means operated by the rotary movements of the brakes effective to equalize the braking effect of said brakes, and ineffective to transmit the rotary forces of the brakes to produce said angular movements.

7. In a brake system, the combination with duplicate brakes each having rotary movement on one axis and bodily angular movement on another axis, of means operated by the braking forces of the brakes to equalize said forces, said means being pivotally mounted on the axes of angular movement of the brakes whereby the braking forces are ineffective to produce said bodily angular movements.

8. In a brake system including duplicate brakes, the combination of two brake elements, each having rotary movement on one axis and bodily angular movement on another axis, means operated by the action of unequal braking effects of the brake elements to produce oppositely directed rotary movements of said elements, and means operable by said rotary movements to produce oppositely applied variations in the braking pressure of said elements.

9. In a brake system including duplicate brakes, the combination of two brake bands each having rotary movement on one axis and bodily angular movement on another axis, and means operated by rotary movements of the bands to equalize their braking effect.

10. In a brake system, the combination with duplicate brakes having predetermined limits of free rotary movement, of means operated by rotary movement of either brake in excess of said limits to equalize the braking effect of said brakes.

11. In a brake system, the combination with duplicate adjustable brakes and means for simultaneously applying the same, of means operable upon application of the brakes to audibly indicate a predetermined inaccuracy in their adjustment.

In testimony whereof I hereunto affix my signature.

GEORGE L. SMITH.